(12) United States Patent
Kuwahara et al.

(10) Patent No.: US 8,640,844 B2
(45) Date of Patent: Feb. 4, 2014

(54) DRY CLUTCH

(75) Inventors: Takashi Kuwahara, Isehara (JP);
Shigeru Ishii, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 278 days.

(21) Appl. No.: 13/130,437

(22) PCT Filed: Nov. 25, 2009

(86) PCT No.: PCT/JP2009/069881
§ 371 (c)(1),
(2), (4) Date: May 20, 2011

(87) PCT Pub. No.: WO2010/061855
PCT Pub. Date: Jun. 3, 2010

(65) Prior Publication Data
US 2011/0220451 A1    Sep. 15, 2011

(30) Foreign Application Priority Data

Nov. 25, 2008 (JP) ................................. 2008-299019
Nov. 25, 2009 (JP) ................................. 2009-266958

(51) Int. Cl.
*F16D 25/08* (2006.01)
(52) U.S. Cl.
USPC .................. 192/85.53; 192/85.54; 192/113.5
(58) Field of Classification Search
USPC ........... 192/85.44, 85.45, 85.43, 85.54, 113.5
See application file for complete search history.

(56) References Cited

U.S. PATENT DOCUMENTS

| 2,890,687 | A | | 6/1959 | Richmond | |
| 3,230,792 | A | | 1/1966 | Kelley et al. | |
| 3,480,115 | A | * | 11/1969 | Lallemant | ..................... 188/71.5 |
| 3,800,928 | A | | 4/1974 | Pray | |
| 4,979,602 | A | | 12/1990 | Fukushima | |
| 5,234,087 | A | * | 8/1993 | Jurgens et al. | ................ 192/3.58 |
| 5,720,372 | A | | 2/1998 | Shino et al. | |
| 5,735,376 | A | * | 4/1998 | Moroto et al. | .............. 192/85.49 |
| 5,743,370 | A | | 4/1998 | Thomire | |
| 5,803,222 | A | * | 9/1998 | Arndt | ........................... 192/70.2 |
| 6,289,790 | B1 | | 9/2001 | Rey | |
| 7,489,114 | B2 | | 2/2009 | Nomura et al. | |
| 8,376,112 | B2 | * | 2/2013 | Kuwahara et al. | .......... 192/85.53 |
| 2003/0106759 | A1 | | 6/2003 | Sakai et al. | |
| 2010/0307883 | A1 | | 12/2010 | Patzner et al. | |

FOREIGN PATENT DOCUMENTS

| CN | 101018687 A | 8/2007 |
| CN | 101365897 A | 2/2009 |
| JP | 49-37041 A | 4/1974 |
| JP | 2006-137406 | 6/2006 |
| JP | 2006-137406 A | 6/2006 |
| JP | 2006-250364 A | 9/2006 |

* cited by examiner

*Primary Examiner* — David D Le
*Assistant Examiner* — Ryan Dodd
(74) *Attorney, Agent, or Firm* — Foley & Lardner LLP

(57) ABSTRACT

In a dry clutch, the space between dry-clutch plates and a bearing, which bearing is interposed between a first piston and a second piston, is blocked off. Also provided is a structure for supplying the bearing with lubricating oil, and thus it is possible to provide the dry clutch, without causing upsizing the bearing.

5 Claims, 3 Drawing Sheets

DRY CLUTCH

TECHNICAL FIELD

The present invention relates to a dry clutch.

BACKGROUND ART

Patent document 1 has disclosed a conventional dry clutch. The dry clutch includes a first piston, which is movable in a cylinder formed in a motor cover under oil pressure supplied, and a second piston, which is installed on the first piston via a bearing interposed between them. Engagement and release of the dry clutch is performed by operating the second piston by means of sliding motion of the first piston. The reason for the provision of the bearing is that the first piston is accommodated in the motor cover, serving as a stationary wall, whereas the second piston serves as a piston brought into direct-contact with a side face of one of clutch plates through which connection and disconnection of rotors can be made, and thus relative rotation between the first and second pistons must be permitted.

Patent document: Japanese Patent Provisional Publication No. 2006-137406 (A)

DISCLOSURE OF THE INVENTION

Task Solved by the Invention

In the device disclosed in Patent document 1, in which the bearing is interposed between the first and second pistons, to prevent wear, oil lubrication for the bearing is required. However, when lubricating oil is supplied to the bearing, part of the lubricating oil tends to be unintendedly supplied to the dry clutch. That is, it would be difficult to supply lubricating oil to the bearing without any leakage of lubricating oil to the dry clutch. Hence, to satisfy a required performance of the bearing, there is a problem that the size of the bearing has to be further enlarged, instead of lubricating the bearing.

Means to Solve the Task

It is, therefore, in view of the previously-described disadvantages of the prior art, to provide a dry clutch configured to permit a supply of lubricating oil to a bearing interposed between both pistons without any undesirable leakage of lubricating oil to dry-clutch plates and also without upsizing the bearing.

In order to accomplish the aforementioned and other objects, in a dry clutch of the present invention, lubricating oil is supplied to a bearing, while blocking off a space between dry-clutch plates and the bearing, which is interposed between a first piston and a second piston.

Effects of the Invention

Therefore, according to the dry clutch of the present invention, the dry-clutch plates can be partitioned from the bearing by means of the blocking-off member, it is possible to supply to the bearing with lubricating oil, thus enhancing a reliability as well as a durability of the bearing. Additionally, it is possible to downsize the bearing and also to realize the space-saving of the clutch by virtue of the downsized bearing.

DESCRIPTION OF THE PREFERRED EMBODIMENTS

First Embodiment

The dry clutch of the present invention is hereunder explained in detail in reference to the drawings of the embodiments shown.

Figure 1:
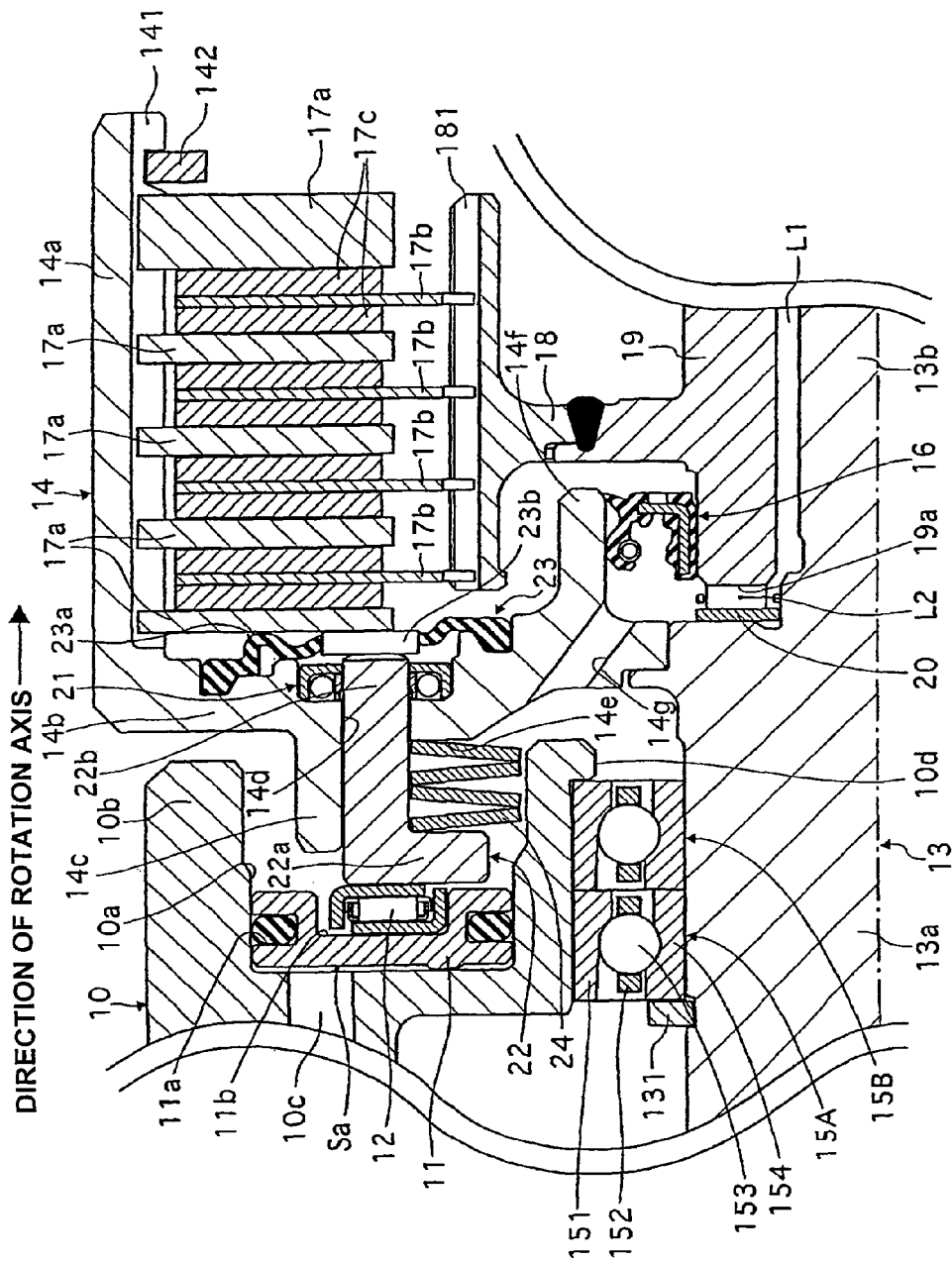
FIG. 1 is a partially-enlarged cross-sectional view illustrating a dry clutch of the first embodiment.

FIG. 1 is the partially-enlarged cross-sectional view illustrating the dry clutch of the first embodiment. The dry clutch of the first embodiment is a clutch configured to engage and release a first rotor 13 with and from a second rotor 19 (including a hub member 18 described later). As hereinafter described in detail, the dry clutch is constructed by a plurality of component parts, namely, dry-clutch plates, pistons, and the like. Herein, the direction indicated by the arrow in FIG. 1 is defined as a direction of rotation axis.

A cylinder member 10, serving as a non-rotational member, is provided with a cylindrical extension 10b, extending in the rotation-axis direction. A cylinder groove 10a is formed as an annular bore closed at one end, on the side of the extension 10b, opposite to the rotation-axis direction. An oil passage 10c, formed in the cylinder member 10, is opened into the bottom of the cylinder groove 10a.

An annularly-shaped, first piston 11 is accommodated in the cylinder groove 10a. Seal members 11a are fitted into respective grooves, namely, an inner peripheral side grooved portion and an outer peripheral side grooved portion of the first piston 11, in a manner so as to permit the piston to slide in the cylinder groove 10a, while ensuring a fluid-tight relationship between the cylinder groove 10a and each of the seal members. Consequently, a cylinder chamber Sa is defined between the cylinder groove 10a and the backface of the first piston 11.

A recessed groove 11b is formed in the sidewall portion interconnecting the inner peripheral side and the outer peripheral side of the first piston 11. A thrust bearing 12 is accommodated in the recessed groove 11b. The depth of recessed groove 11b is shaped and dimensioned to be shallower than the total axial thickness containing both the thicknesses of inner and outer races of thrust bearing 12 in the rotation-axis direction.

A second piston 22 is arranged on the side of thrust bearing 12, facing in the rotation-axis direction. The second piston 22 has an annular piston-body section 22a and a lug section 22b having a plurality of substantially cylindrical, circumferentially-arranged and put-up lugs. The backface of the piston-body section 22a of the second piston 22 is kept in contact with the thrust bearing 12, and thus it is possible to transmit only a thrust force, while permitting relative rotation between the first and second pistons 11 and 22. The supporting structure of the second piston 22 is described later.

A clutch member 14 is attached onto the first rotor 13. The clutch member 14 has a partition wall portion 14b (a blocking-off member) extending radially from the outer periphery of the first rotor, and a drum portion 14a extending from the outer periphery of the partition wall portion 14b in the rotation-axis direction. Integrally formed on the side face of the partition wall portion 14b, facing the first piston, is a small cylindrical portion 14c extending in the direction opposite to the rotation-axis direction. The second piston 22 is supported on the inner periphery of small cylindrical portion 14c in a manner so as to be axially movable.

Furthermore, the partition wall portion 14b has a piston bore 14d extending along the inner periphery of small cylindrical portion 14c. The piston bore 14d is formed and configured to be substantially conformable to the position of lug section 22b. The bore diameter of the piston bore is dimensioned to be substantially identical to the circumference of the lug section 22b. Also, the outermost peripheral section of piston bore 14d is configured to be substantially conformable to the inner periphery of small cylindrical portion 14c. Thus, the circumference of the lug section 22b can be supported by the inner periphery of small cylindrical portion 14c. That is, it is possible to provide a stable supporting structure by lengthening the axial length of the supporting portion in the rotation-axis direction.

A spring supporting flat face 14e is formed on the side face of the partition wall portion 14b, facing the first piston, and on the radially inward side of piston bore 14d. A return spring 24 is disposed between the piston-body section 22a of the second piston 22 and the spring supporting flat face 14e, such that a force is exerted from the partition wall portion 14b on the second piston 22 to force the second piston in the direction opposite to the rotation-axis direction.

A reciprocation seal 21 is fitted to the opening of piston bore 14d, facing a dry-clutch plate 17a in a fluid-tight fashion. The reciprocation seal 21 serves as a fluid-tight seal for preventing a lubricating-oil leakage from the aperture between the piston bore 14d and each of lugs of lug section 22b even when the lug section 22b axially reciprocates. That is to say, in the first embodiment, the partition wall portion 14b, constructing a part of the first rotor 13, and the reciprocation seal 21 construct the blocking-off member for blocking off the space between the thrust bearing 12 and dry-clutch plates 17 in a fluid-tight fashion.

Furthermore, the blocking-off member of the first embodiment is provided with a blocking-off portion 23 installed on the side of partition wall portion 14b, facing the dry-clutch plate 17a. The blocking-off portion 23 has a flexible section 23a made of an elastic material and a motion-transmission section 23b sandwiched between the top of lug section 22b and the dry-clutch plate 17a. Flexible section 23a is a flexible member, which is able to self-support to such an extent that the transmission section 23b can be held in place, and also to easily deform elastically. Rubber or resin material, or metal bellows can be applied to such a flexible member. Transmission section 23b is formed of a ring-shaped metal material, whose diameter is dimensioned to be greater than the circumference of the lug section 22b. The transmission section acts to transmit a force (a pressure) from the lug section 22b therevia directly to the dry-clutch plate 17a.

Transmission section 23b is supported on and fixedly connected to the flexible section 23a in a fluid-tight relationship therebetween. In other words, transmission section 23b is supported on the first rotor 13 and configured to transmit an axial force, produced by a stroke of the first piston 11, to the dry-clutch plate 17a. Also, inner and outer peripheries of flexible section 23a are fixedly connected to the partition wall portion 14b in a fluid-tight fashion. Hereby, even if a leakage of lubricating oil from the reciprocation seal 21 occurs, there is no risk of lubricating-oil leakage toward the side of the dry clutch. In the blocking-off member constructed as previously, even when engagement and release of dry-clutch plates 17 are performed by operating the second piston 22, installed on the first rotor 13, via the thrust bearing 12 by the stroke of the first piston 11 supported by the non-rotational member, lubricating oil can be blocked off from dry-clutch plates 17, while lubricating the thrust bearing 12 with lubricating oil. As a further advantage, the partition wall portion 14b, partly constructing the blocking-off member, is supported on the first rotor 13, and thereby it is possible to reduce the number of component-part pairs, in which relative rotation of a body to a second body is enabled, thus eliminating the need for an additional seal installed on the partition wall portion 14b, except for the circumference of the second piston 22.

An internal spline 141 is formed on the inner periphery of drum portion 14a. A snap ring 142 is attached to the axial end of the spline 141 in the rotation-axis direction. A plurality of drive-side dry-clutch plates 17a are splined to the spline 141. Also, each of driven-side dry-clutch plates 17b is sandwiched between the associated drive-side dry-clutch plates 17a, such that the drive-side clutch plates and the driven-side clutch plates alternate each other, in the rotation-axis direction. Friction facings 17c are attached onto respective side faces of each of driven-side dry-clutch plates 17b. By the way, drive-side dry-clutch plates 17a and driven-side dry-clutch plates 17b are collectively referred to as "dry-clutch plates 17".

A hub member 18 is arranged on the inner peripheral side of driven-side dry-clutch plates 17b and has an external spline 181 to which drive-side dry-clutch plates 17b are splined. The inner periphery of hub member 18 is welded to the second rotor 19.

The second rotor 19 is formed into a cylindrical hollow shape. A small-diameter portion 13b of the first rotor 13 is inserted into and arranged on the inner peripheral side of the second rotor. An oil passage L1 is defined by the clearance space between the outer periphery of small-diameter portion 13b and the inner periphery of the second rotor 19. An oil seal 16 is installed between the outer periphery of the second rotor 19 and the inner periphery of a seal-retaining cylindrical portion 14f formed integral with the partition wall portion 14b in a manner so as to axially extend in the vicinity of the inner periphery of partition wall portion 14b in the rotation-axis direction. Also, an oil passage 14g is formed in the partition wall portion 14b in a manner so as to open into the inner peripheral side of seal-retaining cylindrical portion 14f. Furthermore, an annular bearing member 20 is interposed between the axial end face of the second rotor 19, facing in the direction opposite to the rotation-axis direction, and the stepped face of large-diameter and small-diameter portions 13a and 13b of the first rotor 13, thus enhancing a wear-and-abrasion resistance when relative rotation between the first rotor 13 and the second rotor 19 takes place. Moreover, a partially-recessed groove 19a is formed on the axial end face of the second rotor 19, facing in the direction opposite to the rotation-axis direction. The groove 19a is formed as an oil passage L2.

Two ball bearings 15A and 15B are installed on the inner peripheral side of cylinder member 10 in a manner so as to be juxtaposed to each other. Ball bearing 15B is engaged with cylinder member 10 such that the axial end of its outer race, facing in the rotation-axis direction, is kept in abutted-engagement with an engaged section 10d extending inwards from the inner periphery of cylinder member 10, in the rotation-axis direction. Also, the adjacent ball bearing 15A is engaged with a snap ring 131 such that the axial end of its inner race, facing in the direction opposite to the rotation-axis direction, is kept in abutted-engagement with the snap ring, in the opposite axial direction. Additionally, snap ring 131 is fitted into a groove formed on the outer periphery of the first rotor 13.

In the first embodiment, as ball bearings 15A-15B, ball bearings, each having the same specification, are used, and thus only the ball bearing 15A is hereunder described in detail. Ball bearing 15A is comprised of an inner race 154 supported on the outer periphery of large-diameter portion 13a of the first rotor 13, an outer race 151 supported on the inner periphery of cylinder member 10, a plurality of balls 153 confined between inner and outer races 154 and 151 and spaced from each other circumferentially, and a cage 152 for holding each of balls 153 in place.

The outer peripheral side of inner race 154, facing the balls 153, is formed into a tapered shape whose cross-section is tapered downward (viewing in the drawing) and decreased in the rotation-axis direction. In a similar manner, the inner peripheral side of outer race 151, facing the balls 153, is formed into a tapered shape whose cross section is tapered upward (viewing in the drawing) and decreased in the direction opposite to the rotation-axis direction. That is, the ball bearing constructs an angular ball bearing.

When a thrust force, acting in the rotation-axis direction, is imposed on the first rotor 13, an axial force, transferred from snap ring 131, acts on the inner race 154 of ball bearing 15B adjacent to ball bearing 15A. This force is transmitted via balls 153 to outer race 151, and then transmitted to the engaged section 10d at which the ball bearing is engaged with the inner periphery of cylinder member 10. In this manner, the thrust force, inputted into the first rotor 13, is stably supported through ball bearings 15A and 15B, thus realizing a stable rotary-motion support.

[Engaging and Releasing Action of Clutch]

Engaging and releasing action of the dry clutch is hereunder described in detail. Herein, an initial state, recited in the explanation of the engaging/releasing action, is defined as a specific state where the first rotor 13 is in a stopped state, and additionally the second rotor 19 is rotating. Thus, in the initial state, there is no relative rotation between the first piston 11 and the second piston 22, and additionally, the first and second pistons 11 and 22 are both forced and positioned leftwards (viewing in FIG. 1) by means of return spring 24.

When an oil pressure is supplied from a hydraulic control unit (not shown) toward the oil passage 10c, oil flows into cylinder chamber Sa and thus an oil pressure, whose magnitude is dependent on the spring bias off return spring 24 and the resistance to sliding motion, is produced. As a result, a thrust force acts on the first piston 11. The thrust force is transmitted through thrust bearing 12 to the second piston 22, in a manner so as to move the first and second pistons 11 and 22 against the spring bias of return spring 24 in the rotation-axis direction. By virtue of the displacement (the piston stroke), the transmission section 23b is displaced in the rotation-axis direction by a push of the top of lug section 22b, and then a play-elimination is made to such an extent that a group of dry-clutch plates 17a, 17b, and 17c are brought into abutted-engagement with the snap ring 142. At this time, owing to the displacement of the second piston 22, transmission section 23b also moves in the rotation-axis direction, and hence an appropriate deformation of the flexible section 23a occurs.

As soon as the play-elimination has been completed, the displacement of each of the pistons also terminates, and then an engagement pressure, which is set by means of the hydraulic control unit, begins to occur. Depending on the engagement pressure occurring, torque of the second rotor 19 can be transmitted to the first rotor 13, and thus the first rotor 13 begins to rotate. On the one hand, the second piston 22 is installed on the first rotor 13. On the other hand, the first piston 11 is installed on the cylinder member 10. Hence, when the first rotor 13 begins to rotate, the second piston 22 also begins to rotate. As a result, relative rotation between the second piston 22 and the first piston 11 via the thrust bearing 12 occurs.

[Route of Action of Force During Engaging Period]

As discussed previously, under a state where the clutch engagement pressure occurs, as viewed in the rotation-axis direction, a push of each of the pistons finally acts on the snap ring 142. As a result of this, by means of the snap ring 142 forced in the rotation-axis direction, clutch member 14 is pushed in the direction (that is, in the rotation-axis direction) spaced apart from the cylinder member 10.

Consequently, the first rotor 13, coupled to the clutch member 14, is also pulled in the rotation-axis direction by a force (hereinafter referred to as "pulling force"). At this time, because of the snap ring 131 installed on the first rotor 13, the pulling force acts on the inner races 154 of ball bearings 15A and 15B through the snap ring 131. As appreciated from the above, the pulling force is finally transmitted to the engaged portion 10d.

[Distribution Channel of Lubricating Oil]

The distribution channel of lubricating oil is hereunder described in detail. Lubricating oil, supplied from the hydraulic control unit (not shown), first, passes through the oil passage L1 defined between the outer periphery of the first rotor 13 and the inner periphery of the second rotor 19, and then passes through the oil passage L2 formed on the axial end of the second rotor 19, facing in the direction opposite to the rotation-axis direction, and delivered to the oil passage 14g. At this time, oil seal 16 prevents lubricating oil from flowing out toward the dry-clutch side.

A part of lubricating oil, flowing from the oil passage 14g toward the piston side, flows into the ball bearings 15A and 15B. Also, a part of the lubricating oil, delivered from the oil passage, flows into the thrust bearing 12. Even when the lubricating oil has been supplied to the second piston 22, by means of reciprocation seal 21 and blocking-off portion 23 there is no risk that the lubricating oil flows into the dry-clutch side.

In taking the lubricating-oil distribution channel, it is possible to certainly supply lubricating oil to each of ball bearings 15A and 15B and thrust bearing 12, each supporting a high load. As appreciated from the above, irrespective of lubricating-oil supply, there is no risk that the supplied lubricating oil flows into the dry-clutch side.

As explained above, the dry clutch of the first embodiment provides the following enumerated operation and effects.

(1) The dry clutch includes a first piston 11 supported by a cylinder member 10 (a non-rotational member), a second piston 22 operated responsively to a stroke of the first piston 11, dry-clutch plates 17 for engaging a first rotor 13 with or releasing it from a second rotor 18, 19, a thrust bearing 12 (a bearing) interposed between the first piston 11 and the second piston 22 in a manner so as to permit relative rotation between the first and second pistons 11, 22, oil passages L1, L2, 14g (lubricating means) for supplying lubricating oil to the thrust bearing 12, a partition wall portion 14b and a blocking-off portion 23 constructing a blocking-off member for blocking off a space between the thrust bearing 12 and the dry-clutch plates 17, and motion-transmission means configured to be supported by the first rotor 13 and provided for transmitting an axial force created by the stroke of the first piston 11 via the second piston 22 to the dry-clutch plates 17. As the transmission means, the dry clutch is also provided with a piston bore 14d formed in the partition wall portion 14b and a motion-transmission section 23b attached to the blocking-off portion 23.

By means of the partition wall portion 14b and the blocking-off portion, the dry-clutch plates 17 can be partitioned, and thus it is possible to supply lubricating oil to the thrust bearing 12, thereby enhancing a reliability as well as a durability of the thrust bearing 12. Additionally, it is possible to downsize the thrust bearing 12 and also to realize the space-saving of the dry clutch by virtue of the downsized thrust bearing. In the first embodiment, thrust bearing 12 is used. In lieu thereof, a ball bearing or a bushing may be used.

(2) The partition wall portion 14b is a member having the piston bore 14d (a bore) extending in the radial direction of the first rotor 13 and bored in the rotation-axis direction. The second piston 22 has a lug section 22b having lugs put up in the rotation-axis direction and configured to be able to be inserted into the piston bore 14d. The transmission means is configured such that the lug section 22b moves the piston bore 14d in the rotation-axis direction.

The partition wall portion 14b is integrally connected to the first rotor 13. Thus, regardless of a rotating state, it is possible to transmit the axial force of the second piston 22 to the dry-clutch plates 17, while suppressing lubricating oil from flowing into the dry-clutch plates 17.

(3) The outer periphery of the lug section 22b and the inner periphery of the piston bore 14d are configured to be substantially conformable to each other. Hence, it is possible to reduce a clearance space between the lug section 22b and the piston bore 14d, thus more greatly enhancing a fluid-tight performance (a blocking-off performance) between the piston side and the dry-clutch plates 17.

(4) A return spring 24 is disposed between the partition wall portion 14b and the second piston 22. Hence, regardless of a rotating state, it is possible to force the second piston 22 toward its initial position, with the dry clutch disengaged. This contributes to a reduced friction loss.

(5) The blocking-off portion 23 has the motion-transmission section 23b configured to be sandwiched between the second piston 22 and the dry-clutch plates 17, and a flexible section 23a configured to hold the transmission section 23b in place, while permitting an axial displacement of the transmission section 23b. Hence, even when there is a leakage of lubricating oil from the clearance space between the lug section 22b and the piston bore 14d, it is possible to prevent the lubricating oil from flowing toward the dry-clutch plates 17 by means of the flexible section 23a. In this case, to perform the force transmission for the axial force of the second piston 22, an elastic force, arising from deformation of the flexible section 23a, has to be created. At this time, the axial force can be received directly by the transmission section 23b, thus improving the durability.

Second Embodiment

Figure 2:
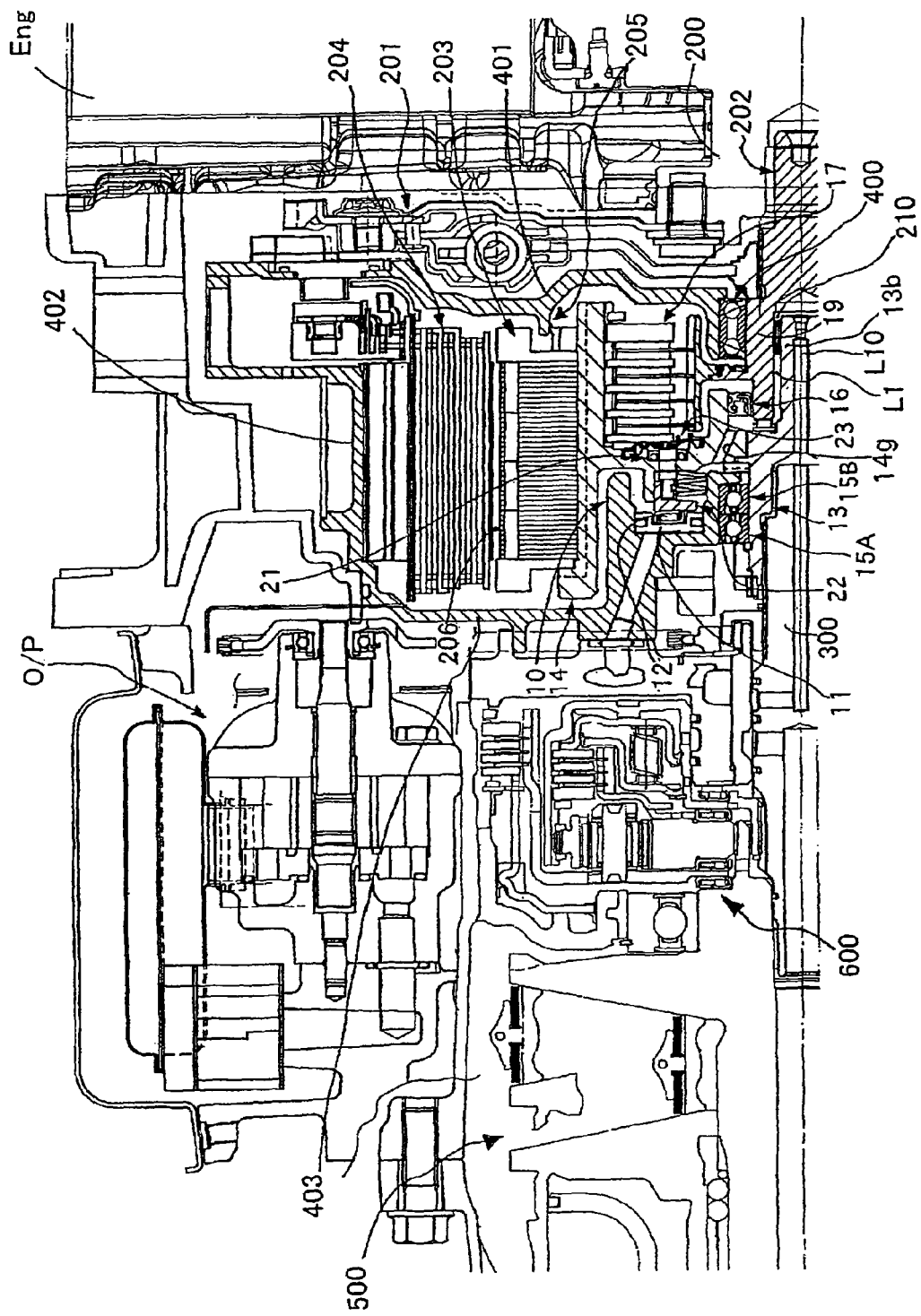
FIG. 2 is a partial cross section illustrating the second embodiment in which the dry clutch of the first embodiment is applied to a hybrid vehicle.

The second embodiment is hereunder explained in detail. FIG. 2 is a partial cross section illustrating the second embodiment in which the dry clutch of the first embodiment is applied to a hybrid vehicle. A damper 201 is installed on a crankshaft 200 of an engine Eng. The damper 201 is splined to a first input shaft 202. The first input shaft 202 is fitted into an axial bore formed in the crankshaft 200 and rotatably supported such that relative rotation between them is permitted. The damper 201 is comprised of two disk-shaped members and coil springs installed between these disk-shaped members, and configured to suppress vibrations in the rotational direction and also to absorb vibrations in the inclined direction (in the left-to-right direction, viewing in the drawing).

The second rotor 19 is connected to the first input shaft 202. The second rotor 19 is rotatably supported by a bearing 400 installed on the inner periphery of a partition wall 401. A needle bearing 210 is interposed between the cylindrical-hollow portion formed in the second rotor 19 and the small-diameter portion 13b. The needle bearing support both the first rotor 13 and the second rotor 19, while permitting relative rotation between them. The first rotor 13 has an axial oil passage L10 formed in its inner periphery, so as to supply lubricating oil supplied from a control valve unit (not shown) to the oil passage L1. This ensures an adequate supply of lubricating oil to the needle bearing 210. The small-diameter portion 13b of the first rotor 13 is supported by the needle bearing 210 installed on the inside of the cylindrical-hollow portion of the second rotor 19, and thus the needle bearing 210 can be laid out to overlap with the bearing 400 installed to be substantially conformable to the partition wall 401 in the rotation-axis direction. Therefore, even when a force, oriented in the direction perpendicular to the rotation-axis direction, acts on the supporting portion between the first rotor 13 and the second rotor 19, there is a less occurrence of moment of force, imposed on one of the first and second rotors from the other and acting in the inclined direction (the left-to-right direction, viewing in the drawing).

A rotor 203 of an electric motor is installed on the outer periphery of the clutch member 14. A stator 204 of the electric motor is arranged outside of the rotor 203 and installed on the inner periphery of an external wall 402. An air gap 206 is defined between the rotor 203 and the stator 204. A seal 205 is formed on one end of the rotor 203, facing the engine side, to provide a fluid-tight seal, kept in a sliding-contact relationship with the partition wall 401.

The first rotor 13 is rotatably supported by ball bearings 15A and 15B (collectively referred to as "ball bearings 15"), installed on the inner periphery of cylinder member 10. The cylinder member 10 is supported by a partition wall 403. That is, the hybrid vehicle of the second embodiment is equipped with an electric drive unit accommodated between the engine Eng and an automatic transmission 500. The electric drive unit is a drive unit in which the electric motor and the dry clutch are accommodated in a unit housing, comprised of the partition wall 401, the external wall 402, and the partition wall 403.

A second input shaft 300 is connected to the first rotor 13. Power, inputted into the second input shaft 300, is transmitted from the second input shaft 300 to a forward/reverse changeover mechanism 600 and a belt-drive continuously-variable automatic transmission 500, so as to rotate drive road wheels (not shown). An oil pump O/P is provided outside of the forward/reverse changeover mechanism 600. The oil pump O/P is driven by the second input shaft 300 via a chain.

Figure 3A:
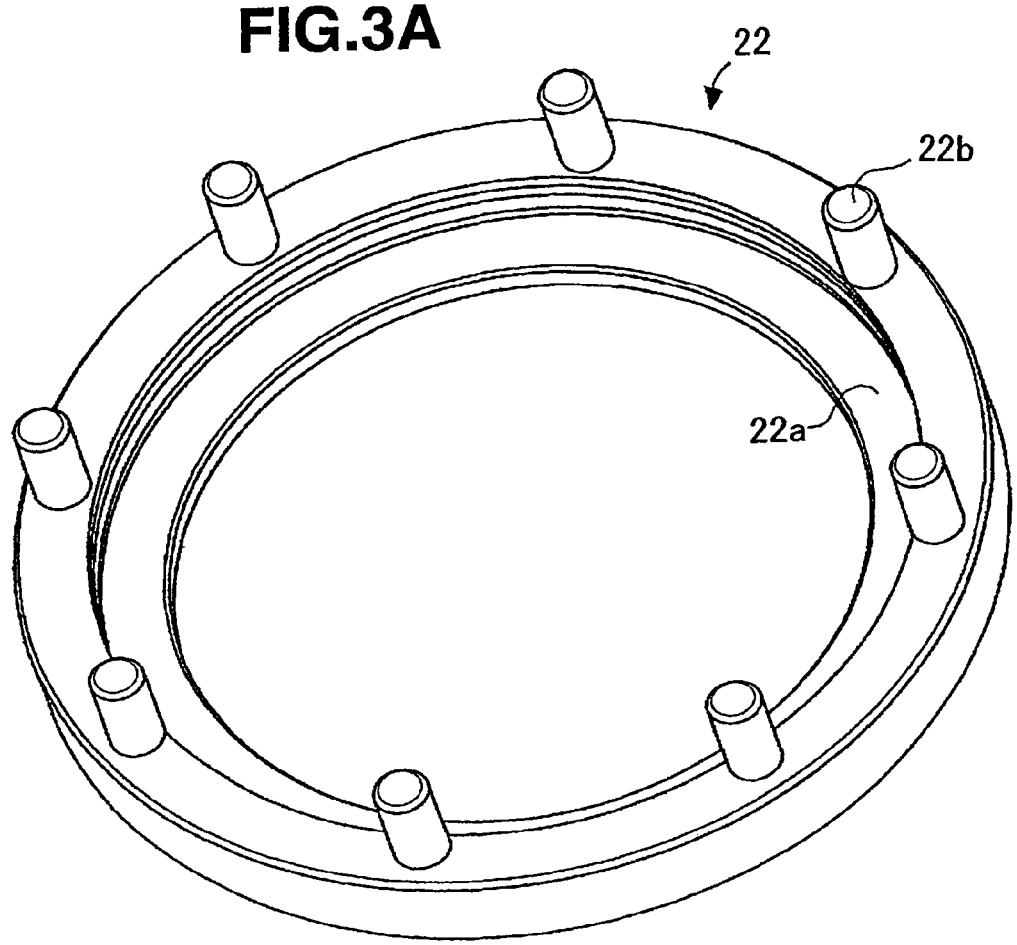
FIGS. 3A-3B are perspective views illustrating a detailed structure of the second piston applied to the second embodiment.
Figure 3B:
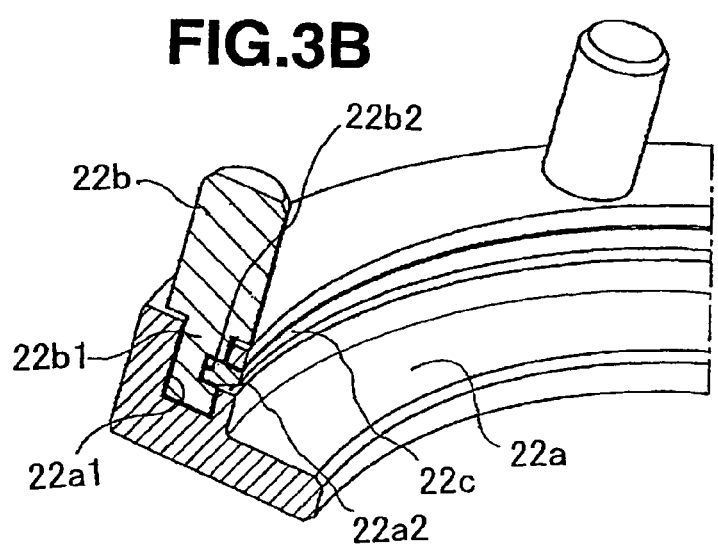

FIGS. 3A-3B are perspective views illustrating a detailed structure of the second piston applied to the second embodiment. As shown in FIG. 3A, the second piston 22 has an annular piston-body section 22a and a lug section 22b having a plurality of circumferentially-equidistant-spaced put-up lugs. As shown in FIG. 3B, the piston-body section 22a is formed with lug-mounting holes 22a1 and a ring groove 22a2 opening into each of lug-mounting holes 22a1. Each of the lugs of lug section 22b is formed with an insertion portion 22b1 inserted into the associated lug-mounting hole 22a1 and a notch 22b2 leveled with the ring groove 22a2 as viewed in the axial direction, with the insertion portions 22b1 inserted into the respective lug-mounting holes. By inserting each of the lugs of lug section 22b into the respective lug-mounting holes 22a1, and by installing and fitting a snap ring 22c to the ring groove 22a2, the piston-body section 22a and the lug section 22b are assembled to each other, thereby producing the second piston 22.

(6) The first rotor 13 is supported in the unit housing via the bearings 15, 400, and 210 installed to be substantially conformable to the partition walls 401 and 403, which walls are configured to sandwich the blocking-off portion 23 between them in the rotation-axis direction and also serve as two frame structures (frame walls) for supporting the first rotor 13 and the second rotor 19. Additionally, for the purpose of avoiding an occurrence of moment of force, imposed on each of the rotors and acting in the inclined direction, the blocking-off portion 23 is provided with the axial oil passage L10 (a lubricating-oil passage) for supplying lubricating oil to the needle bearing 210, which bearing is a support bearing installed in the vicinity of the dry-clutch plate 17a, and the oil passage 14g, which is a through hole communicating the axial oil passage L10 for supplying lubricating oil to the thrust bearing 12 disposed between the first piston 11 and the transmission section 23b. Thus, even when the needle bearing 210 and the thrust bearing 12 are laid out to be spaced from each other in the rotation-axis direction in a manner so as to sandwich the blocking-off member between them, it is possible to lay out the needle bearing 210 and the thrust bearing 12 on the lubricating-oil distribution channel and thus it is possible to lubricate these bearings without forming two different lubricating-oil passages separately from each other.

(7) The lubricating-oil passage between the needle bearing 210, which bearing is a support bearing installed in the vicinity of the dry-clutch plate 17a, and the oil passage 14g, which is a through hole formed in the blocking-off member (exactly, the partition wall portion 14b), is formed in the form of a clearance space defined between the first rotor 13 and the second rotor 19. Thus, it is possible to provide the lubricating-oil passage by the utilization of the existing clearance space, while being spaced apart from the dry-clutch plates.

(8) The transmission means includes the second piston 22 operated responsively to a stroke of the first piston 11, and the transmission section 23b is formed as a rigid body for transmitting the axial force, produced by a stroke of the second piston 22, to the dry-clutch plates 17. The transmission means is also provided with the blocking-off portion 23 arranged between the partition wall portion 14b and the transmission section 23b and serving as a seal means (an elastic member) configured to permit a change in relative position between the partition wall portion 14b and the transmission section 23b by elastic deformation without any sliding motion, when the change in relative position between the partition wall portion 14b and the transmission section 23b occurs. Thus, regarding the blocking-off portion 23, serving as a seal means, there is no sliding-contact portion among the blocking-off portion 23, the transmission section 23b, and the other part (the partition wall portion), and therefore it is possible to enhance a sealing performance and a durability.

What is claimed is:

1. A dry clutch comprising:
   dry-clutch plates for engaging and releasing a first rotor with and from a second rotor;
   a first piston supported by a non-rotational member;
   a second piston supported by the first rotor and operated responsively to a stroke of the first piston;
   a bearing interposed between the first piston and the second piston and configured to permit relative rotation between the first and second pistons; and
   a lubricating element configured to supply the bearing with lubricating oil,
   wherein the first rotor has a partition wall portion and a blocking-off portion configured to block off a space between the bearing and the dry-clutch plates, the blocking-off portion comprising:
      a flexible section made of an elastic material, and
      a motion-transmission section arranged between the second piston and the dry-clutch plates and configured to transmit an axial force of the second piston to the dry-clutch plates and to block off a space between the second piston and the dry-clutch plates,
   wherein the partition wall portion extends in a radial direction of the first rotor and has a piston bore bored in a rotation-axis direction, and
   wherein the blocking-off portion is installed on a side face of the partition wall portion facing the dry-clutch plates.

2. The dry clutch as claimed in claim 1, wherein the partition wall portion is provided with a reciprocation seal between the piston bore and the second piston.

3. The dry clutch as claimed in claim 1, wherein the second piston comprises a lug section including lugs disposed in the rotation-axis direction and configured to be inserted into the piston bore, and
   wherein an outer periphery of the lug section and an inner periphery of the piston bore are configured to substantially conform to each other.

4. The dry clutch as claimed in claim 1, wherein a return spring is disposed between the partition wall portion and the second piston.

5. The dry clutch as claimed in claim 1, further comprising:
   a second-rotor support bearing supporting the second rotor on the non-rotational member;
   a first-rotor support bearing disposed so as to overlap with the second-rotor support bearing in the rotation-axis direction and supporting the first rotor on the second rotor; and
   an oil seal installed between the second rotor and the partition wall portion,
   an oil passage,
   wherein the oil passage is a though hole formed in the partition wall portion and configured to open into an inner periphery of a seal-retaining cylindrical portion formed integrally with the partition wall portion so as to axially extend in a vicinity of the partition wall portion in the rotation-axis direction,
   wherein lubricating oil passes through the oil passage to lubricate the first-rotor support bearing and the bearing interposed between the pistons, and
   wherein the space between the bearing and the dry-clutch plates is blocked off by the partition wall portion, the blocking-off portion, and the oil seal.

* * * * *